United States Patent
Kalyanasundharam et al.

(10) Patent No.: US 11,210,248 B2
(45) Date of Patent: Dec. 28, 2021

(54) SYSTEM DIRECT MEMORY ACCESS ENGINE OFFLOAD

(71) Applicant: Advanced Micro Devices, Inc., Santa Clara, CA (US)

(72) Inventors: Vydhyanathan Kalyanasundharam, Santa Clara, CA (US); Narendra Kamat, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/723,709

(22) Filed: Dec. 20, 2019

(65) Prior Publication Data

US 2021/0191890 A1 Jun. 24, 2021

(51) Int. Cl.
G06F 13/28 (2006.01)
G06F 12/10 (2016.01)
G06F 13/40 (2006.01)

(52) U.S. Cl.
CPC .............. *G06F 13/28* (2013.01); *G06F 12/10* (2013.01); *G06F 13/4027* (2013.01); *G06F 2212/65* (2013.01)

(58) Field of Classification Search
CPC .................................. G06F 5/10; G06F 13/28
See application file for complete search history.

(56) References Cited

U.S. PATENT DOCUMENTS 7,814,166 B2   10/2010  Suzuoki
8,848,727 B2   9/2014   Saraiya et al.
2003/0007396 A1*  1/2003  Walker ............... G06F 5/10
                                                  365/200
2005/0135322 A1*  6/2005  Lim .................. H04W 88/08
                                                  370/342
2007/0180161 A1*  8/2007  Asada ............... G06F 13/28
                                                  710/22
2011/0141969 A1*  6/2011  Sridhara ........... H04W 74/0833
                                                  370/328
2011/0205913 A1*  8/2011  Van Zelst .......... H04B 7/0617
                                                  370/252
2011/0280314 A1*  11/2011 Sankaran ........... H04N 19/42
                                                  375/240.25
2015/0378737 A1*  12/2015 Debbage ............ G06F 5/14
                                                  712/225

(Continued)

FOREIGN PATENT DOCUMENTS

EP              1466448 B1      2/2011

*Primary Examiner* — Getente A Yimer
(74) *Attorney, Agent, or Firm* — Volpe Koenig

(57) ABSTRACT

Systems, devices, and methods for direct memory access. A system direct memory access (SDMA) device disposed on a processor die sends a message which includes physical addresses of a source buffer and a destination buffer, and a size of a data transfer, to a data fabric device. The data fabric device sends an instruction which includes the physical addresses of the source and destination buffer, and the size of the data transfer, to first agent devices. Each of the first agent devices reads a portion of the source buffer from a memory device at the physical address of the source buffer. Each of the first agent devices sends the portion of the source buffer to one of second agent devices. Each of the second agent devices writes the portion of the source buffer to the destination buffer.

20 Claims, 5 Drawing Sheets

(56) References Cited

U.S. PATENT DOCUMENTS

| | | | |
|---|---|---|---|
| 2015/0378953 A1* | 12/2015 | Debbage | G06F 13/1673 710/117 |
| 2018/0239725 A1 | 8/2018 | Kumar et al. | |
| 2019/0243552 A1 | 8/2019 | Maharana et al. | |

\* cited by examiner

SYSTEM DIRECT MEMORY ACCESS ENGINE OFFLOAD

BACKGROUND

A system direct memory access (SDMA) engine is a device which coordinates direct memory access (DMA) transfers of data between devices and memory, or between different locations in memory, within a computer system. A SDMA engine is typically located on a processor, such as a graphics processor (GPU), and receives commands from an application running on the processor. Based on the commands, the SDMA engine reads data from an SDMA source (e.g., a first memory buffer defined in main memory), and writes data to a SDMA destination (e.g., a second buffer defined in main memory).

A SDMA source and SDMA destination are physically located on different devices in some cases. In multiprocessor systems, the SDMA source and SDMA destination are located on different devices associated with different processors in some cases. In such cases, the SDMA engine resolves virtual addresses to obtain physical addresses, and issues remote read and/or write commands to effect the DMA transfer.

BRIEF DESCRIPTION OF THE DRAWINGS

A more detailed understanding can be had from the following description, given by way of example in conjunction with the accompanying drawings wherein.

DETAILED DESCRIPTION

Figure 1:
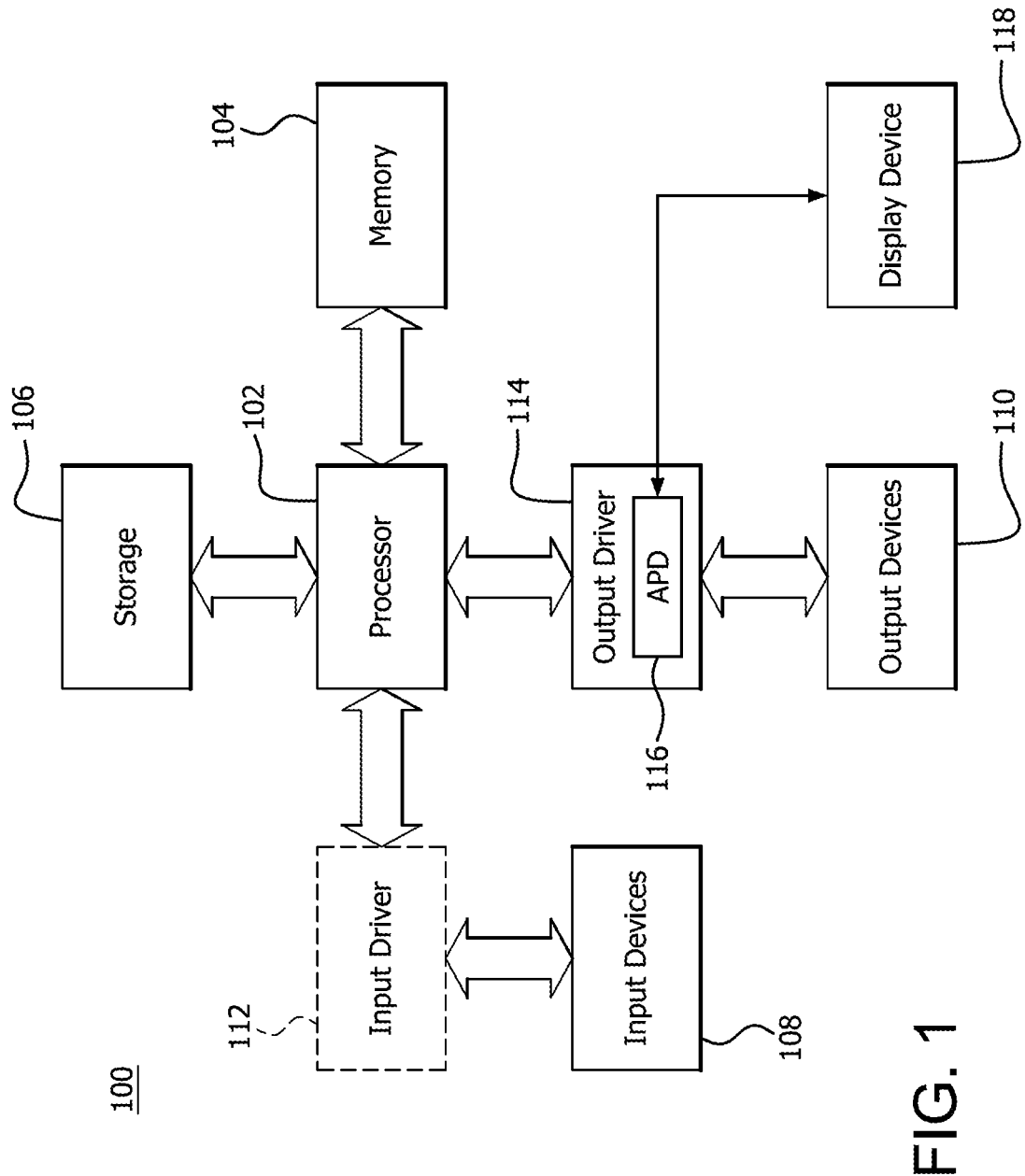
FIG. 1 is a block diagram of an example device in which one or more features of the disclosure can be implemented.

Some implementations provide a computing system configured for direct memory access. The system includes a SDMA device on a processor die. The SDMA device sends a message to a data fabric device. The message includes a physical address of a source buffer, a physical address of a destination buffer, and a size of a data transfer from the source buffer to the destination buffer. The data fabric device sends an instruction or instructions to first agent devices. The instruction includes the physical address of the source buffer, the physical address of the destination buffer, and the size of the data transfer. The first agent devices each read a portion of the source buffer from a memory device at the physical address of the source buffer. The first agent devices each also send the portion of the source buffer to one of second agent devices. The second agent devices each operate a memory controller to write the portion of the source buffer to the destination buffer.

In some implementations, the SDMA device receives an instruction or instructions from a processor on the processor die. The instruction or instructions indicate a virtual address of the source buffer and a virtual address of the destination buffer. The SDMA device translates the virtual address of the source buffer into the physical address of the source buffer. The SDMA device translates the virtual address of the destination buffer into the physical address of the destination buffer. In some implementations, the data fabric device includes a miscellaneous (MISC) function block of a data fabric. In some implementations, the agent devices include coherent slave devices of a data fabric. In some implementations, the first agent devices are on the processor die, and the second agent devices are on a remote processor die. In some implementations, the second agent devices are on the processor die, and the first agent devices are on the remote processor die. In some implementations, each of the first agent devices store the portion of the source buffer in a local buffer before sending the portion of the source buffer to one of the second agent devices. Some implementations include a coherent link between the processor die and a remote processor die, and the first agent devices communicate with the second agent devices over the coherent link. In some implementations, the first agent devices each operate a memory controller to read the portion of the source buffer from the memory device at the physical address of the source buffer. In some implementations, the data fabric device broadcasts the instruction or instructions to the first agent devices.

Some implementations provide a method for direct memory access. The method includes sending a message from a system direct memory access (SDMA) device disposed on a processor die to a data fabric device. The message includes a physical address of a source buffer, a physical address of a destination buffer, and a size of a data transfer from the source buffer to the destination buffer. The method also includes sending an instruction or instructions by the data fabric device to first agent devices. The instruction or instructions include the physical address of the source buffer, the physical address of the destination buffer, and the size of the data transfer. The method also includes each of the first agent devices reading a portion of the source buffer from a memory device at the physical address of the source buffer. The method also includes each of the first agent devices sending the portion of the source buffer to one of second agent devices. The method also includes each of the second agent devices writing the portion of the source buffer to the destination buffer.

Some implementations include the SDMA device receiving an instruction or instructions from a processor of the processor die. The instruction indicates a virtual address of the source buffer and a virtual address of the destination buffer. Some implementations include the SDMA device translating the virtual address of a source buffer into the physical address of the source buffer. Some implementations include the SDMA device translating the virtual address of the destination buffer into the physical address of the destination buffer. In some implementations, the data fabric device includes a MISC function block of a data fabric. In some implementations, the agent devices include coherent slave devices of a data fabric. In some implementations, the first agent devices are on the processor die, and the second agent devices are on a remote processor die. In some implementations, the second agent devices are on the processor die, and the first agent devices are on a remote processor die. Some implementations include each of the first agent devices storing the portion of the source buffer in a local buffer before sending the portion of the source buffer to one of the second agent devices. Some implementations include the first agent devices communicating with the second agent devices over a coherent link between the processor die and a remote processor die. Some implementations include each of the first agent devices operating a memory controller to read the portion of the source buffer from a memory device at the physical address of the source buffer. Some implementations include the data fabric device broadcasting the instruction or instructions to the first agent devices.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units that perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provide graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
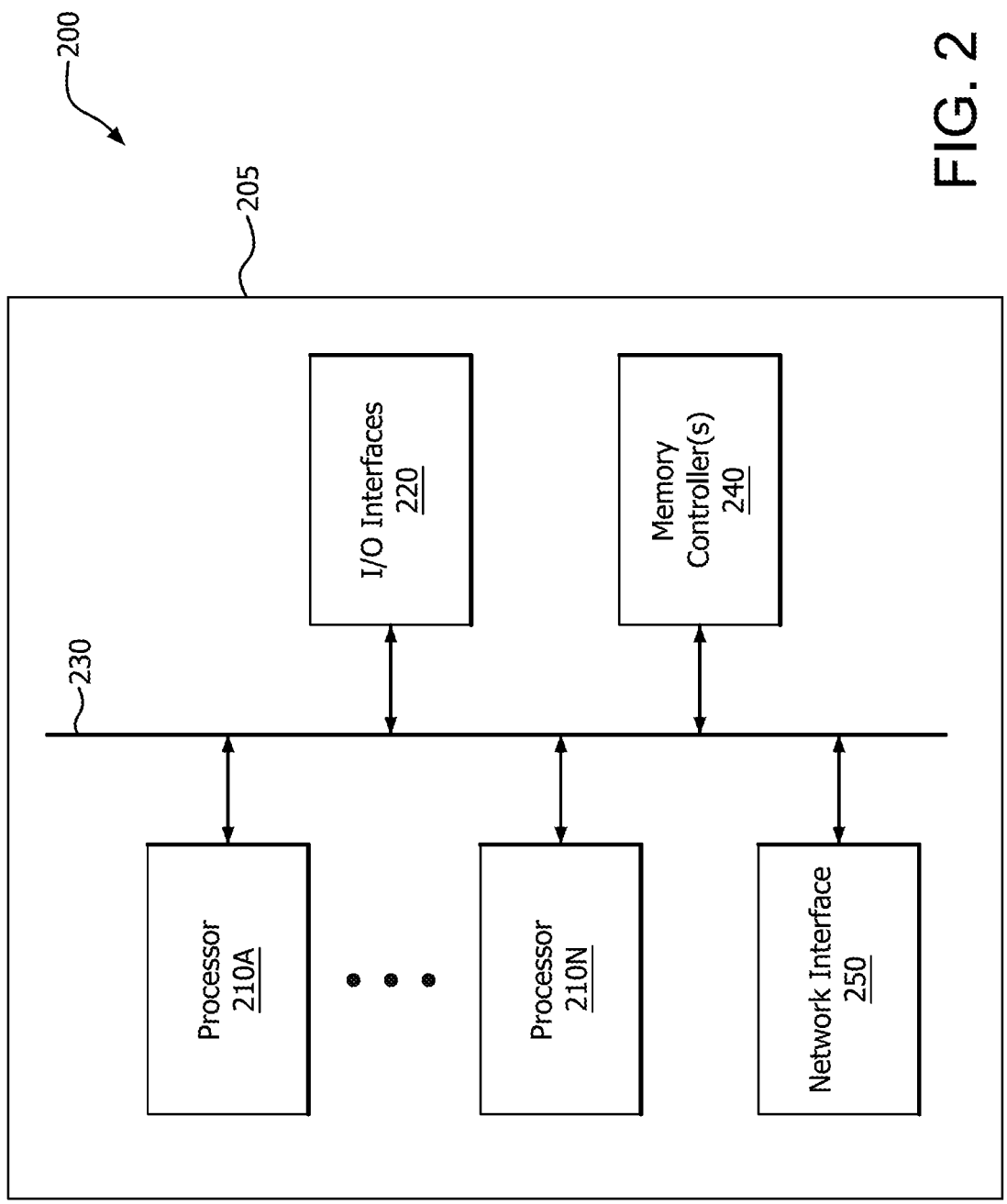
FIG. 2 is a block diagram illustrating portions of an example computing system.

FIG. 2 is a block diagram illustrating portions of an example computing system 200. In some examples, computing system 200 is implemented using some or all of device 100, as shown and described with respect to FIG. 1. Computing system 200 includes a first semiconductor die 205. Semiconductor die 205 includes one or more processors 210A-N, input/output (I/O) interfaces 220, interconnect 230, memory controller(s) 240, and network interface 250. In other examples, computing system 200 includes further components, different components, and/or is arranged in a different manner.

In some implementations, each of processors 210A-N includes one or more processing devices. In this example, at least one of processors 210A-N includes one or more general purpose processing devices, such as CPUs. In some implementations, such processing devices are implemented using processor 102 as shown and described with respect to FIG. 1. In this example, at least one of processors 210A-N includes one or more data parallel processors. Examples of data parallel processors include GPUs, digital signal processors (DSPs), field programmable gate arrays (FPGAs), application specific integrated circuits (ASICs), and so forth. In some implementations, such processing devices are implemented using APD 116 as shown and described with respect to FIG. 1.

In some implementations, each processor includes a cache subsystem with one or more levels of caches. In some implementations, each core complex 210A-N includes a cache (e.g., level three (L3) cache) which is shared among multiple processor cores.

Memory controller 240 includes at least one memory controller accessible by core complexes 210A-N, e.g., over interconnect 230. Memory controller 240 includes one or more of any suitable type of memory controller. Each of the memory controllers are coupled to (or otherwise in communication with) and control access to any number and type of memory devices (not shown). In some implementations, such memory devices include Dynamic Random Access Memory (DRAM), Static Random Access Memory (SRAM), NAND Flash memory, NOR flash memory, Ferroelectric Random Access Memory (FeRAM), and/or any other suitable memory device. Interconnect 230 includes any computer communications medium suitable for communication among the devices shown in FIG. 2, such as a bus, data fabric, or the like.

I/O interfaces 220 include one or more I/O interfaces (e.g., peripheral component interconnect (PCI) bus, PCI-Extended (PCI-X), PCIE (PCI Express) bus, gigabit Ethernet (GBE) bus, universal serial bus (USB), and the like). In some implementations, I/O interfaces 220 are implemented using input driver 112, and/or output driver 114 as shown and described with respect to FIG. 1. Various types of peripheral devices can be coupled to I/O interfaces 220. Such peripheral devices include (but are not limited to) displays, keyboards, mice, printers, scanners, joysticks or other types of game controllers, media recording devices, external storage devices, network interface cards, and so forth. In some implementations, such peripheral devices are implemented using input devices 108 and/or output devices 118 as shown and described with respect to FIG. 1.

Figure 3:
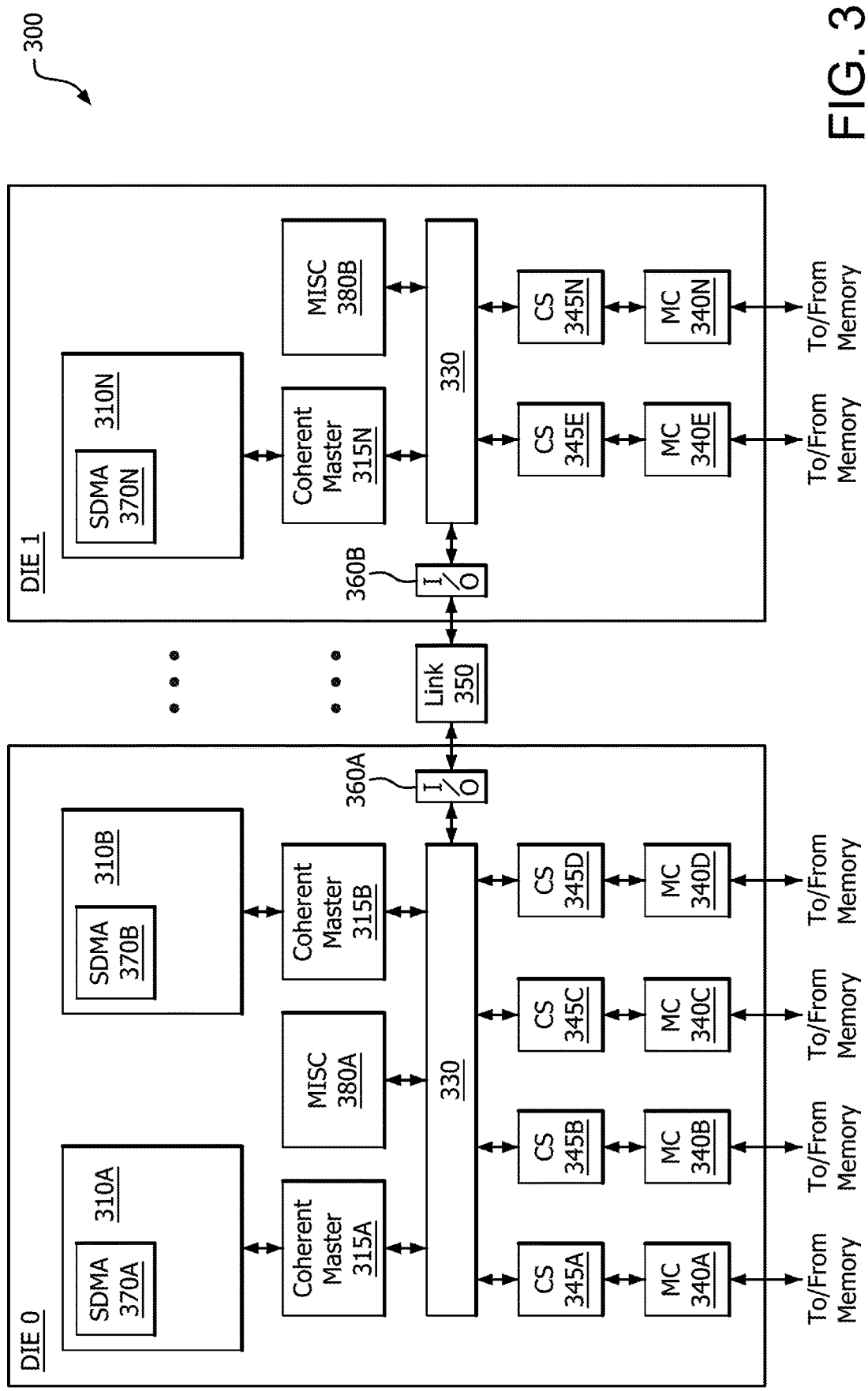
FIG. 3 is a block diagram illustrating portions of an example multi-processor computing system.

FIG. 3 is a block diagram illustrating portions of an example multi-processor computing system 300. System 300, or portions thereof, is implementable using some or all of semiconductor die 205 (as shown and described with respect to FIG. 2) and/or device 100 (as shown and described with respect to FIGS. 1 and 2).

System 300 includes one or more processors 310A-N and one or more memory controllers 340A-N in communication with processors 310A-N over interconnect 330 (e.g., via other components). In some examples, processors 310A-N are coupled to interconnect 330 via coherent masters 315A-N, and memory controllers 340A-N are coupled to interconnect 330 via coherent slaves 345A-N. Interconnect 330, coherent masters 315A-N, and coherent slaves 345A-N form parts of a data fabric which facilitates communication among components of system 300.

System 300 includes semiconductor die 0 and semiconductor die 1 in this example, and a coherent link 350 extends the data fabric over both dies via interconnect 330 and I/O interfaces 360A-B (which also form part of the data fabric). Interconnect 330 includes any computer communications medium suitable for communication among the devices shown in FIG. 3, such as a bus, data fabric, or the like. Each of processors 310A-N includes one or more processor cores (e.g., CPUs and/or GPUs, as discussed regarding FIG. 2). Each of processors 310A-N also includes a corresponding SDMA engine 370A-N.

Each processor 310A-N communicates with a corresponding coherent master 315A-N. In some implementations, a coherent master is an agent that processes traffic flowing over an interconnect (e.g., interconnect 330) and manages coherency for a connected CPU or core complex. In some implementations, to manage coherency, a coherent master receives and processes coherency-related messages and probes, and generates and transmits coherency-related requests and probes.

Each processor 310A-N communicates with one or more coherent slaves 345A-N via its corresponding coherent master 315A-N and over interconnect 330. A coherent slave is an agent device that manages coherency for a memory controller (e.g., a memory controller connected to the coherent slave). In some implementations, to manage coherency, a coherent slave receives and processes requests and probes that target a corresponding memory controller.

Processor 310A communicates with coherent slave 345A through coherent master 315A and interconnect 330 in the example of FIG. 3. Coherent slave (CS) 345A communicates with memory controller (MC) 340A, which controls a memory device (e.g., a main memory DRAM device). In some implementations, each processor 310A-N is in communication with any suitable number of memory controllers 340A-N via a corresponding coherent master 315A-N and corresponding coherent slaves 340A-N.

Probes include messages passed from a coherency point (e.g., the coherent slave) to one or more caches in the computer system to request a response indicating whether the caches have a copy of a block of data and, in some implementations, to indicate a cache state into which the cache should place the block of data. In some implementations, if a coherent slave receives a memory request targeting its corresponding memory controller (e.g., a memory request for data stored at an address or a region of addresses in a memory controlled by the memory controller for which the coherent slave manages coherency), the coherent slave performs a lookup (e.g., a tag-based lookup) to its corresponding cache directory to determine whether the request targets a memory address or region cached in at least one cache line of any of the cache subsystems.

SDMA engines 370A-N coordinate DMA transfers of data between devices and memory, or between different locations in memory, within system 300. SDMA engines 370A-N are capable of receiving instructions from their corresponding processors 310A-N. Based on the received instructions, in some cases, SDMA engines 370A-N read and buffer data from any memory via the data fabric, and and write the buffered data to any memory via the data fabric. In some implementations, based on the received instructions, SDMA engines 370A-N send a message to a data fabric device, such as a miscellaneous (MISC) block of the data fabric, with instructions to effect a DMA.

MISC blocks 380A-B are data fabric devices that handle miscellaneous functions. In some cases, MISC blocks 380A-B host power management and interrupt functions. In some examples, MISC blocks 380A-B host SDMA functions as discussed herein. For example, MISC block 380A receives a message from SDMA engine 370A (e.g., via an agent device, such as coherent master 315A) with instructions to effect a DMA transfer of a specified size from a source buffer at a physical address to a destination buffer at a physical address. In this example, MISC block 380A also broadcasts a corresponding command to agent devices on the same die (e.g., coherent slaves 345A-D) to effect the DMA transfer, e.g., as further discussed herein.

In some implementations, interconnect 330 is connected to and/or in communication with other components, which are not shown in FIG. 3 for ease of description. For example, in some implementations, interconnect 330 includes connections to one or more network interfaces 250 as shown and described with respect to FIG. 2).

Figure 4:
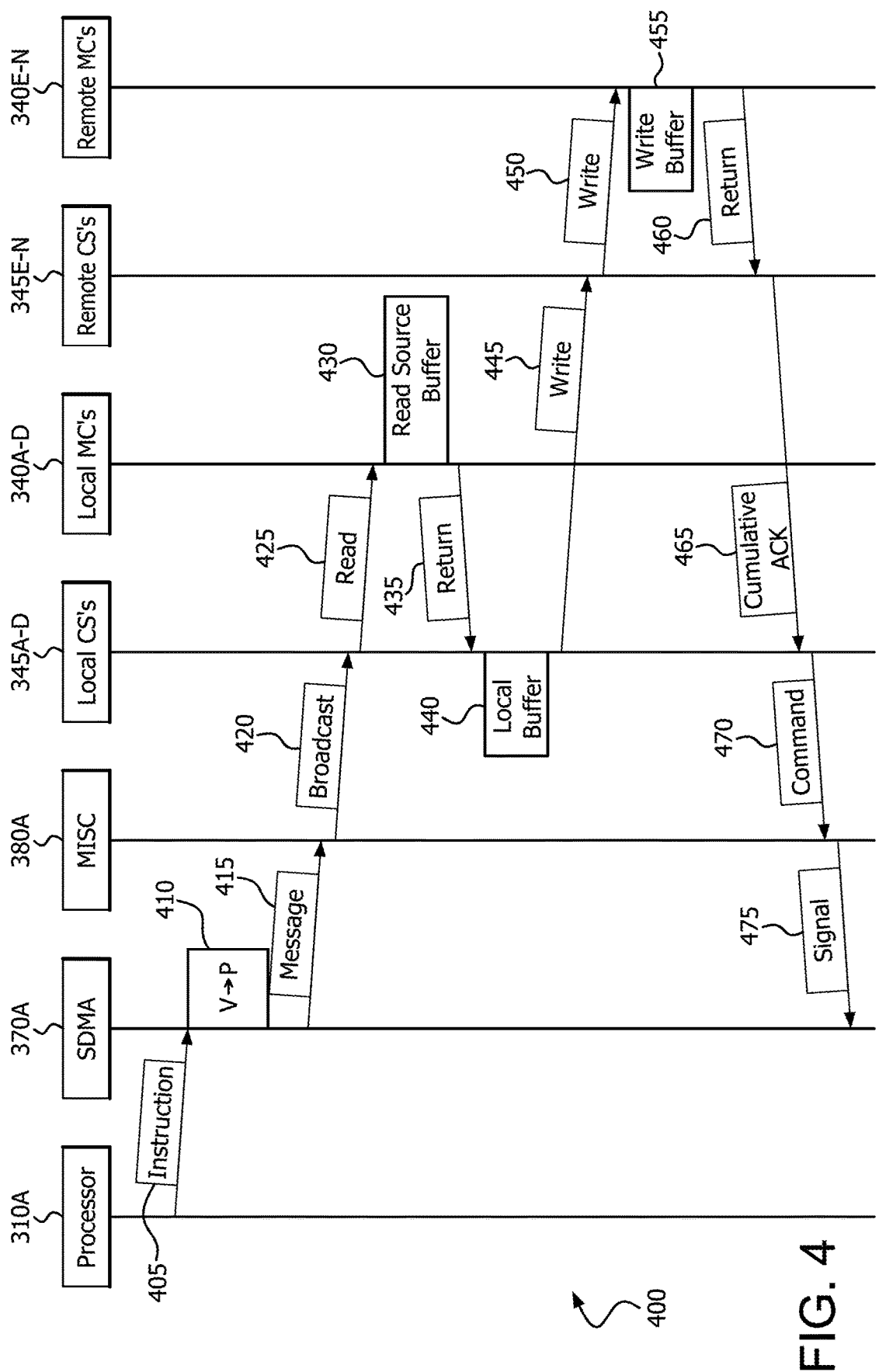
FIG. 4 is a message sequence chart illustrating example direct memory access messaging.

FIG. 4 is a message sequence chart illustrating example direct memory access messaging 400, which is implementable among devices of system 300 as shown and described with respect to FIG. 3, for example.

SDMA 370A coordinates a DMA from a source memory buffer physically located on a memory local to processor 310A (i.e., accessible via on-die memory controllers 340A-440B) to a destination buffer physically located on a memory local to processor 310N (i.e., accessible via on-die memory controllers 340E-N). This is referred to as a "read local, write remote" DMA herein. A corresponding "read remote, write local" operation is effected by rearranging the messaging accordingly. Similarly, corresponding "read local, write local" or "read remote, write remote" operations are also effected by rearranging the messaging accordingly.

Processor 310A sends a SDMA command, which includes a virtual address of the source buffer, a virtual address of the destination buffer, and a size of the data transfer, to SDMA 370A in instruction 405. It is noted that instruction 405 includes more than one instruction and/or message in some implementations.

SDMA 370A performs a virtual-to-physical address translation of the virtual address of the source buffer and the virtual address of the destination buffer to obtain a physical address of the source buffer and a physical address of the destination buffer, respectively, in step 410.

SDMA 370A sends the physical address of the source buffer, a physical address of the destination buffer, and a size of the data transfer in a SDMA message 415 to MISC block 380A.

MISC block 380A sends a SDMA command broadcast 420 which includes the physical address of the source buffer, a physical address of the destination buffer, and a size of the data transfer to all coherent slave devices on die 0. In this example, CS 345A-D are on die 0.

CS 345A-D each send a read command 425 to their associated local MC 340A-D. Each MC 340A-D reads its corresponding portion of the source buffer in step 430, and returns the source buffer data to CS 340A-D in step 435.

Each CS 340A-D buffers the source buffer data in a local buffer 440 (if and/or as needed) for transmission.

CS 345-A-D each send a remote write command 445 to remote CS 345E-N, which each send a write command 450 to their associated MC 340E-N. Each MC 340E-N writes its corresponding portion of the destination buffer in step 455, and returns an acknowledgement 460 to its respective CS 345E-N. In some implementations, an acknowledgement is requested only for the last transfer (i.e., for the last write command 450), and thus only one acknowledgement 460 is returned for all of the write commands 450.

After the destination buffer has been completely written; i.e., the final MC 340E-N has returned an acknowledgement to its respective CS 345E-N, the CS445E-N receiving the final acknowledgement (or sole acknowledgement in the case where an acknowledgement is requested only for the last write command 450) returns a cumulative acknowledgement 465 to CS445A-D. After receiving cumulative acknowledgement 465, each CS 345A-D issues a command 470 to MISC block 380A to indicate completion of the transfer. In some implementations, command 470 includes an identity of the transfer (e.g., transfer ID). Based on command 470, MISC block 380A sends an indication 475 to SDMA 370A indicating completion of the transfer.

Figure 5:
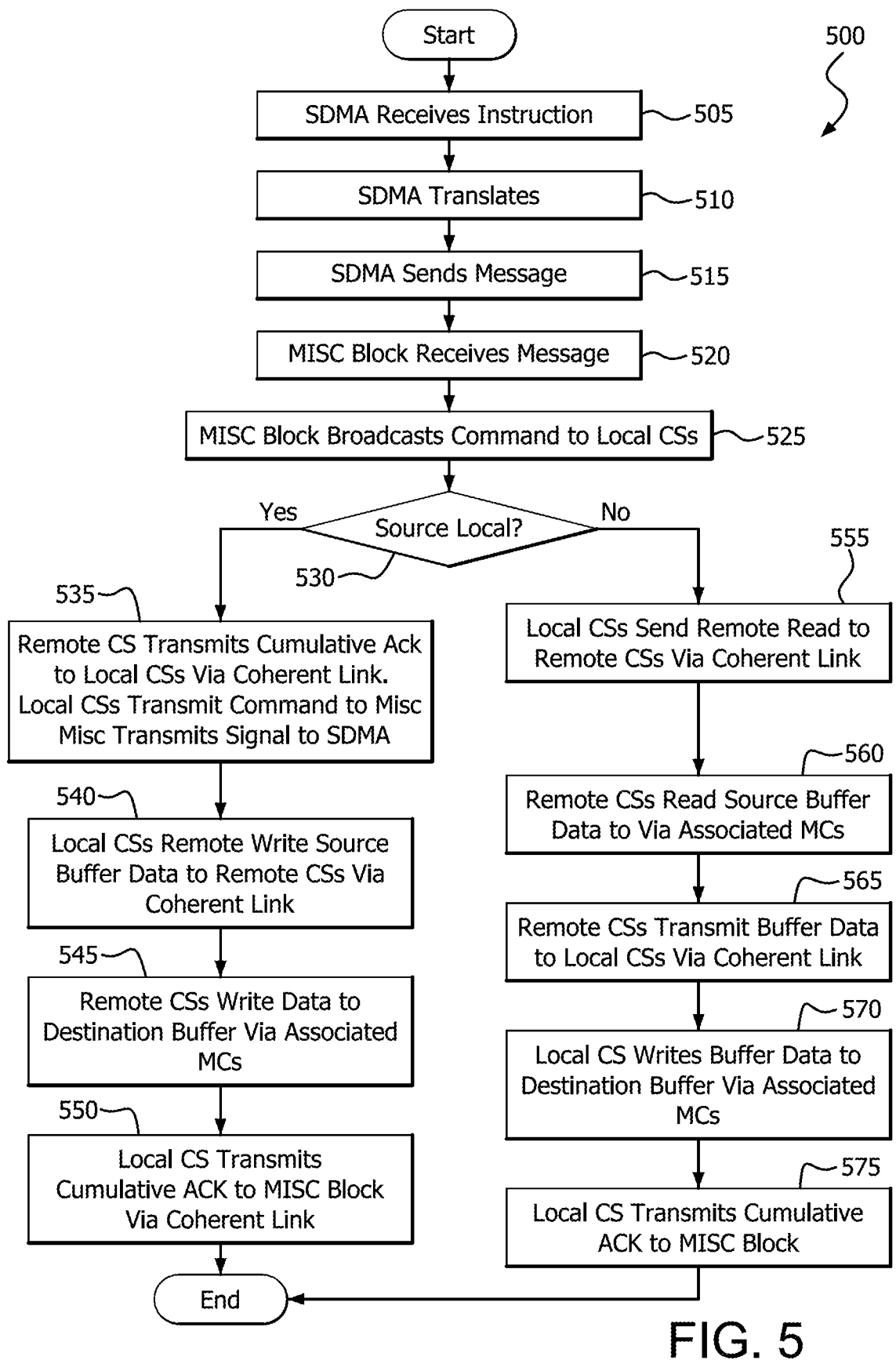
FIG. 5 is a flow chart illustrating an example method for direct memory access.

FIG. 5 is a flow chart illustrating an example method for direct memory access. Method 500 is implementable on system 300 (as shown and described with respect to FIG. 3), for example, and/or using signaling 400 (as shown and described with respect to FIG. 4) in some examples.

In block 505, SDMA 370A receives an instruction from processor 310A. The instruction may be a SDMA command which includes a virtual address of the source buffer, a virtual address of the destination buffer, and a size of the data transfer, e.g., as in instruction 405 (as shown and described with respect to FIG. 4).

In block 510, SDMA 370A performs a virtual-to-physical address translation of the virtual address of the source buffer and the virtual address of the destination buffer to obtain a physical address of the source buffer and a physical address of the destination buffer, respectively (e.g., as shown and described with respect to 410 as shown and described with respect to FIG. 4).

In block 515, SDMA 370A sends the physical address of the source buffer, a physical address of the destination buffer, and a size of the data transfer, to MISC block 380A in block 515 (e.g., message 415 as shown and described with respect to FIG. 4).

In block 520, MISC block 380A receives the message, and in block 525, sends a SDMA command broadcast (e.g., broadcast 420 as shown and described with respect to FIG. 4) which includes the physical address of the source buffer, a physical address of the destination buffer, and a size of the data transfer to all coherent slave devices on die 0. In this example, CS 345A-D are on die 0. In some implementations, broadcast 420 includes an identification of the transfer (e.g., Transfer ID) to identify the transfer job.

On condition 530 that the source buffer is local and the destination buffer is remote, in block 535, local CS 345A-D each send a read command (e.g., command 425 as shown and described with respect to FIG. 4) to their associated MC 340A-D such that each MC 340A-D reads its corresponding portion of the source buffer (if any) and returns the source buffer data to CS 340A-D. Each CS 340A-D buffers the source buffer data in a local buffer (if and/or as needed) for transmission.

In block 540, local CS 345A-D each send a remote write command to remote CS 345E-N to write the buffer to the remote memory. In block 545, remote CS 345E-N, each send a write command to their associated MC 340E-N such that each MC 340E-N writes its corresponding portion of the source buffer data to the destination buffer in its associated memory. After writing its corresponding portion of the destination buffer, each MC 340E-N returns an acknowledgement to its respective CS 345E-N.

In block 550, after the destination buffer has been completely written; i.e., the final MC 340E-N has returned an acknowledgement to its respective CS 345E-N, the CS 345E-N receiving the final acknowledgement returns a cumulative acknowledgement 465 to local CS 345A-D. After receiving cumulative acknowledgement 465, each CS 345A-D issues a command to MISC block 380A to indicate completion of the transfer. In some implementations, command includes an identity of the transfer (e.g., transfer ID). Based on the command, MISC block 380A sends an indication to SDMA 370A indicating completion of the transfer.

On condition 530 that the source buffer is remote and the destination buffer is local, local CS 345A-D each send a remote read command to remote CS 345E-N in block 555. Based on the remote read command, remote CS 345E-N each send a read command to their associated MC 340E-N in block 560 such that MC 340E-N return the source buffer data to CS 345E-N. CS 345E-N buffer the source buffer data in a local buffer (if and/or as needed) for transmission.

Remote CS 345E-N transmit the buffered data to local CS 345A-D over the coherent link in block 565. Local CS 345A-D write the data to the destination buffer at the physical memory address via associated MC 340A-D in block 570. After the destination buffer has been completely written; i.e., the final MC 340A-D has returned an acknowledgement to its respective CS 345A-D, the CS 345A-D receiving the final acknowledgement issues a command to MISC block 380A in block 575 to indicate completion of the transfer. In some implementations, the command includes an identity of the transfer (e.g., transfer ID). Based on the command, MISC block 380A sends an indication to SDMA 370A indicating completion of the transfer.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116) may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A computing system configured for direct memory access, the system comprising:
    a system direct memory access (SDMA) device disposed on a processor die and configured to send, to a data fabric device, a message which includes a physical address of a source buffer, a physical address of a destination buffer, and a size of a data transfer from the source buffer to the destination buffer;
    the data fabric device configured to send, to a first plurality of agent devices, at least one instruction which includes the physical address of the source buffer, the physical address of the destination buffer, and the size of the data transfer;
    the first plurality of agent devices each configured to:
        read a portion of the source buffer from a memory device at the physical address of the source buffer; and
        send the portion of the source buffer to one of a second plurality of agent devices; and
    the second plurality of agent devices are each configured to operate a memory controller to write the portion of the source buffer to the destination buffer.

2. The system of claim 1, wherein the SDMA device is further configured to:
    receive, from a processor of the processor die, at least one instruction which indicates a virtual address of the source buffer and a virtual address of the destination buffer;
    translate the virtual address of the source buffer into the physical address of the source buffer; and
    translate the virtual address of the destination buffer into the physical address of the destination buffer.

3. The system of claim 1, wherein the data fabric device comprises a miscellaneous (MISC) function block of a data fabric.

4. The system of claim 1, wherein the agent devices comprise coherent slave devices of a data fabric.

5. The system of claim 1, wherein:
    the first plurality of agent devices is disposed on the processor die; and
    the second plurality of agent devices is disposed on a remote processor die.

6. The system of claim 1, wherein:
    the second plurality of agent devices is disposed on the processor die; and
    the first plurality of agent devices is disposed on a remote processor die.

7. The system of claim 1, wherein each of the first plurality of agent devices is further configured to store the portion of the source buffer in a local buffer before sending the portion of the source buffer to the one of the second plurality of agent devices.

8. The system of claim 1, further comprising a coherent link between the processor die and a remote processor die, wherein the first plurality of agent devices are further configured to communicate with the second plurality of agent devices over the coherent link.

9. The system of claim 1, wherein the first plurality of agent devices are each further configured to operate a memory controller to read the portion of the source buffer from the memory device at the physical address of the source buffer.

10. The system of claim 1, wherein the data fabric device is further configured to broadcast the at least one instruction to the first plurality of agent devices.

11. A method for direct memory access, the method comprising:
    sending, from a system direct memory access (SDMA) device disposed on a processor die to a data fabric device, a message which includes a physical address of a source buffer, a physical address of a destination buffer, and a size of a data transfer from the source buffer to the destination buffer;
    sending, by the data fabric device to a first plurality of agent devices, at least one instruction which includes the physical address of the source buffer, the physical address of the destination buffer, and the size of the data transfer;
    reading, by each of the first plurality of agent devices, a portion of the source buffer from a memory device at the physical address of the source buffer;
    sending, by each of the first plurality of agent devices, the portion of the source buffer to one of a second plurality of agent devices; and
    writing, by each of the second plurality of agent devices, the portion of the source buffer to the destination buffer.

12. The method of claim 11, further comprising:
    receiving, by the SDMA device from a processor of the processor die, at least one instruction which indicates a virtual address of the source buffer and a virtual address of the destination buffer;
    translating, by the SDMA device, the virtual address of the source buffer into the physical address of the source buffer; and
    translating, by the SDMA device, the virtual address of the destination buffer into the physical address of the destination buffer.

13. The method of claim 11, wherein the data fabric device comprises a miscellaneous (MISC) function block of a data fabric.

14. The method of claim 11, wherein the agent devices comprise coherent slave devices of a data fabric.

15. The method of claim 11, wherein:
    the first plurality of agent devices is disposed on the processor die; and
    the second plurality of agent devices is disposed on a remote processor die.

16. The method of claim 11, wherein:
    the second plurality of agent devices is disposed on the processor die; and
    the first plurality of agent devices is disposed on a remote processor die.

17. The method of claim 11, further comprising storing, by each of the first plurality of agent devices, the portion of the source buffer in a local buffer before sending the portion of the source buffer to the one of the second plurality of agent devices.

18. The method of claim 11, further comprising communicating, by the first plurality of agent devices with the second plurality of agent devices over a coherent link between the processor die and a remote processor die.

19. The method of claim 11, further comprising operating, by each of the first plurality of agent devices, a memory controller to read the portion of the source buffer from a memory device at the physical address of the source buffer.

20. The method of claim 11, further comprising broadcasting the at least one instruction, by the data fabric device, to the first plurality of agent devices.

\* \* \* \* \*